United States Patent
Smith et al.

(10) Patent No.: US 9,930,121 B2
(45) Date of Patent: Mar. 27, 2018

(54) SYSTEM, APPARATUS AND METHOD FOR OPTIMIZING SYMMETRIC KEY CACHE USING TICKETS ISSUED BY A CERTIFICATE STATUS CHECK SERVICE PROVIDER

(71) Applicant: Intel Corporation, Santa Clara, CA (US)

(72) Inventors: Ned M. Smith, Beaverton, OR (US);
Mats G. Agerstam, Portland, OR (US);
Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 14/757,750

(22) Filed: Dec. 23, 2015

(65) Prior Publication Data
US 2017/0034284 A1     Feb. 2, 2017

Related U.S. Application Data

(60) Provisional application No. 62/199,319, filed on Jul. 31, 2015.

(51) Int. Cl.
*H04L 9/32*     (2006.01)
*H04L 29/08*    (2006.01)
(Continued)

(52) U.S. Cl.
CPC .............. *H04L 67/141* (2013.01); *H04L 9/14* (2013.01); *H04L 9/3247* (2013.01);
(Continued)

(58) Field of Classification Search
CPC ....... H04L 67/141; H04L 63/061; H04L 9/14; H04L 9/32; H04L 9/3263; H04L 9/0822;
(Continued)

(56) References Cited

U.S. PATENT DOCUMENTS 5,590,197 A  * 12/1996  Chen ...................... G06Q 20/04
                                                    380/30
7,370,194 B2 *  5/2008  Morais .............. H04L 29/12009
                                                   380/251
(Continued)

FOREIGN PATENT DOCUMENTS

WO     2013123445     8/2013
WO     2014060873     4/2014

OTHER PUBLICATIONS

Denis Trcek, "MAC Based Lightweight Protocols for Strong Authentication and Key Exchange", Journal of Information Science and Engineering 21, 753-765, 2005.*

(Continued)

*Primary Examiner* — Jayesh Jhaveri
(74) *Attorney, Agent, or Firm* — Trop, Pruner & Hu, P.C.

(57) ABSTRACT

In one embodiment, a method includes establishing a first session between a first computing device and a second computing device, when the first computing device does not have connectivity to a credential manager; proxying a request to the credential manager from the second computing device on behalf of the first computing device and receive in the second computing device a first keyless ticket encrypted to the first device and a second keyless ticket encrypted to the second device; providing the second keyless ticket from the second computing device to the first computing device; and enabling communication between the first and second computing devices according to the first and second keyless tickets. Other embodiments are described and claimed.

23 Claims, 6 Drawing Sheets

(51) Int. Cl.
    *H04L 29/06* (2006.01)
    *H04L 9/14* (2006.01)
    *H04L 9/08* (2006.01)
(52) U.S. Cl.
    CPC .......... *H04L 63/061* (2013.01); *H04L 9/0822* (2013.01); *H04L 9/0825* (2013.01); *H04L 9/0833* (2013.01); *H04L 9/321* (2013.01); *H04L 9/3213* (2013.01); *H04L 9/3263* (2013.01); *H04L 63/062* (2013.01)
(58) Field of Classification Search
    CPC ... H04L 9/0825; H04L 9/0833; H04L 63/062; H04L 9/321; H04L 9/3213
    See application file for complete search history.

(56) References Cited

U.S. PATENT DOCUMENTS

| | | | | |
|---|---|---|---|---|
| 2003/0093666 A1* | 5/2003 | Millen | .................. | G06F 21/335 713/157 |
| 2004/0128499 A1* | 7/2004 | Peterka | ................. | H04L 63/062 713/155 |
| 2005/0120214 A1* | 6/2005 | Yeates | ..................... | H04L 63/08 713/171 |
| 2007/0079113 A1 | 4/2007 | Kulkarni et al. | | |
| 2008/0292105 A1* | 11/2008 | Wan | ...................... | H04L 9/0825 380/282 |
| 2015/0026779 A1* | 1/2015 | Ilsar | ...................... | H04W 12/06 726/5 |
| 2016/0277188 A1* | 9/2016 | Quinn | .................. | H04L 9/3213 |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish—Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
Openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.
Openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
Openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
Openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
International Searching Authority, "Notification of Transmittal of the International Search Report and the Written Opinion of the International Searching Authority," dated Sep. 26, 2016, in International application No. PCT/US2016/037528.

* cited by examiner

SYSTEM, APPARATUS AND METHOD FOR OPTIMIZING SYMMETRIC KEY CACHE USING TICKETS ISSUED BY A CERTIFICATE STATUS CHECK SERVICE PROVIDER

This application claims priority to U.S. Provisional Patent Application No. 62/199,319, filed on Jul. 31, 2015, in the names of Ned M. Smith, Mats G. Agerstam, and Nathan Heldt-Sheller, entitled Optimizing Symmetric Key Cache Using Tickets Issued By A Certificate Status Check Service Provider, the disclosure of which is hereby incorporated by reference.

BACKGROUND

Certain types of asymmetric key certificate verification operations depend on a support service that either distributes a Certificate Revocation List (CRL) or an Online Certificate Status Protocol (OCSP) to provide certificate revocation status to a verifier, otherwise the verifier cannot determine whether the certificate has been revoked. Use of certificates with Internet of Things (IoT) devices presents additional challenges due to the constrained environments of many IoT devices. If the CRL is large, there may not be enough storage resource to store the CRL. Consequently, the verifying device is unable to complete path validation, resulting in an inability for the IoT application to function. If instead, the IoT device relies on OCS checking, the verifying device needs to open a connection to the issuing certificate authority (CA). However, network access may not be possible in some circumstances where the requesting device and serving device are in a constrained networking environment (e.g., intermittently connected to an outside network).

DETAILED DESCRIPTION

Figure 1:
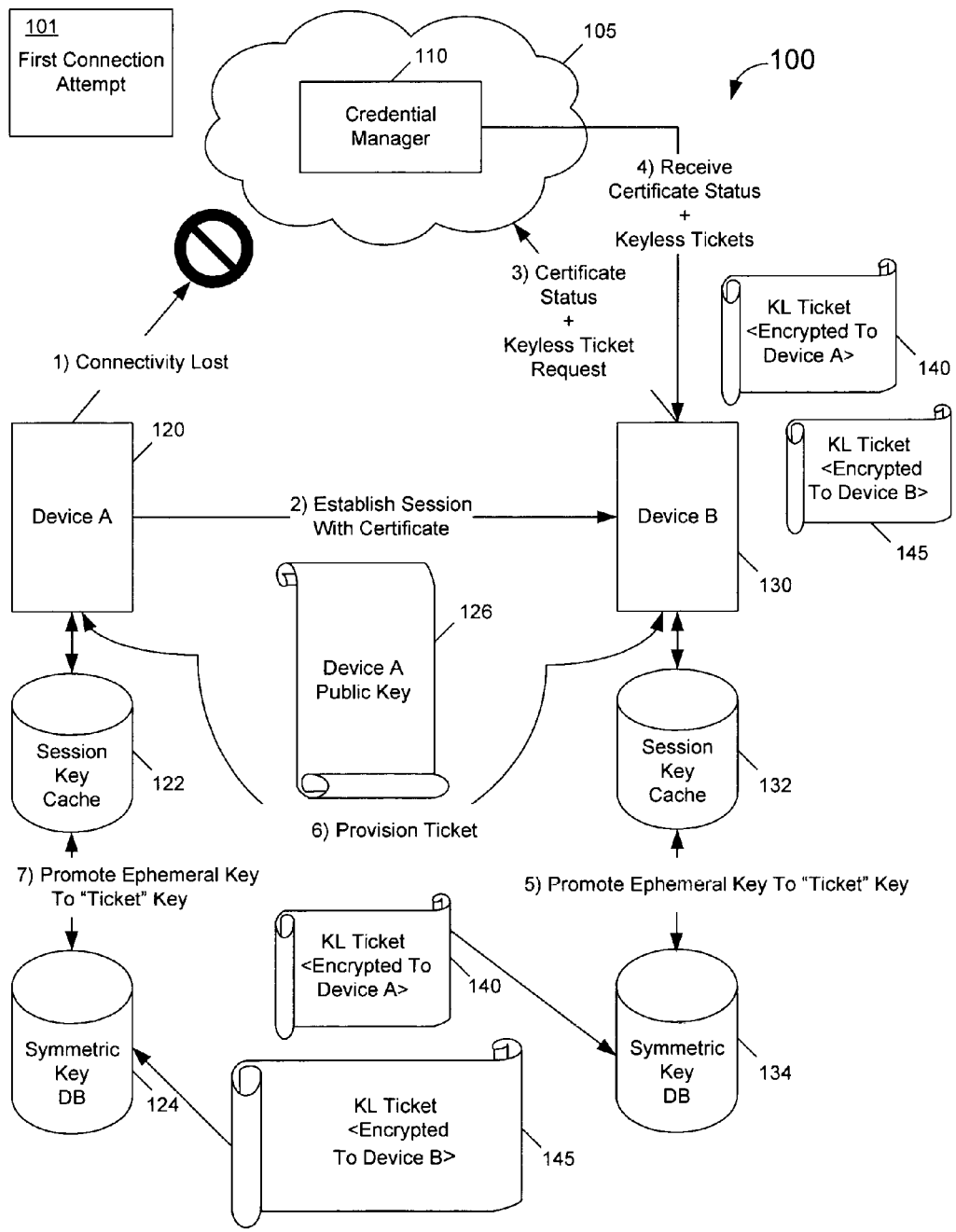
FIG. 1 is a first connection scenario in accordance with an embodiment of the present invention.

In various embodiments, a constrained device such as an IoT device that uses certificates for device authentication can meaningfully establish symmetric key credentials for time periods between intermittent network connectivity.

To this end, embodiments may combine two forms of key management that historically have remained separate. Public key infrastructure (PKI) (Internet Engineering Task Force) (IETF) Request for Comments (RFC) 5280) is a key management method aimed at managing identities based on asymmetric keys. Kerberos [RFC 1510] is a key management method aimed at managing access using symmetric keys. Embodiments may combine aspects of both key management methods to perform authentications as described herein. It is anticipated that a CRL may at least eventually become too large to be stored on an IoT device, and hence the verifying device may employ OCSP. However, constrained devices also may not be able to originate a connection to an outside network hosting a CA, and it may not be practical for CAs to poll the many IoT devices regularly to determine if they happen to require CA services.

To this end, embodiments combine the functionality of a CA with that of a key distribution center (KDC). For a first attempt by a requesting device to access a responding device, a network access is effected to complete the certificate validation. If the responding device does not have network connectivity to the remote network where the CA is hosted, the requesting device is used to proxy the OCSP request.

In addition to obtaining the OCSP status information, the requesting device also obtains a symmetric key ticket with a given (e.g., short) duration expiration. Normally, a KDC will include the symmetric key it generates in the ticket. Consequently, the KDC, requestor and responder all share the symmetric key. Unless all three have equivalent key protection strength-of-function properties, one of the three will be the weak link for potential compromise of the key. Embodiments may reduce this threat by omitting the symmetric key from the ticket, instead using an ephemeral symmetric key that results from a signed Diffie-Hellman exchange. However, the other context that a ticket normally provides (e.g., expiry, realms, authorization, etc.) is supplied with an instruction to retain the ephemeral symmetric key for the duration identified in the ticket.

Embodiments enable the requesting and responding devices to continue to interact securely using symmetric cryptography without the use of asymmetric cryptography and certificates subsequent to a first certificate-based authentication for a period deemed acceptable by a KDC. In an embodiment, this period may correlate to an interval of intermittent availability of the network hosting the KDC/CA. This arrangement is unlike a key cache solution, such as a TLS reconnected session cache, where a global caching policy determined by one or the other TLS endpoints is superseded by a KDC that specifies per-key validity and additional context and authorization contained in the ticket. Unlike a traditional KDC ticket, the KDC does not know the symmetric key, and hence the KDC need not be hardened with a strength-of-function that far exceeds that of the participant devices. As such, it is more feasible for the KDC function to be hosted by a traditional device in an IoT network such as a gateway, larger appliance or tablet device.

Given a scenario where an IoT device may obtain a symmetric key ticket from a KDC but connectivity is intermittently lost, the device may use its certificate to establish a connection to another device using a traditional certificate-based session establishment method (e.g., TLS or DTLS). In an embodiment, the key exchange is halted if the certificate verification step cannot be resolved to a trusted root, complete with revocation status checks. Embodiments allow the handshake to complete without revocation status check completion so that symmetric session keys may be established in a session key cache for each device. However no application data is exchanged until the revocation status is checked. A responder device (Device B) opens a connection to the credential manager (KDC/CA) to obtain certificate status and to make a specialized ticket request, anticipating subsequent interactions with Device A and desiring to optimize session establishment.

Referring now to FIG. 1 shown is a first connection scenario in accordance with an embodiment of the present invention where a device uses an asymmetric key to authenticate because no connection to a credential manager (CM)

exists to obtain a symmetric key ticket. Note that Device B may use its certificate or long term symmetric key to authenticate to the KDC/CA. Device B identifies the original requestor (Device A) to which it already has established a session and requests a keyless ticket. The credential manager (CM) then issues a keyless ticket message that also includes certificate status. The keyless ticket includes additional context relating to the interaction constraints appropriate for the interaction of Device A and B such as the realm, domain, group or zone affiliation, role assignments, validity period and access restrictions and permissions granted. The ticket may additionally describe security practices that are to be administered upon use, for example, contents of the ciphertext may, upon decryption, be scanned for malware or other anomaly. The ticket may be used for subsequent interactions between the devices within the validity period, not only to establish secure (encrypted) communications but may also specify how the recipient should apply additional security scanning and filtering actions.

Device B receives a receipt containing a keyless ticket encrypted to Device A and a keyless ticket encrypted to Device B. As used herein, encrypting a ticket to a device means that the ticket is encrypted based on one or more prior interactions between the given device and a credential manager (such as a key distribution center). Note that this prior interaction between the credential management service (CMS) and a given device (e.g., Device A and/or Device B) may include provisioning of a certificate and trust anchor, such that a secure session can be negotiated using the certificates to authenticate the key exchange. A prior interaction may further constitute the exchange of a shared secret that is supplied to a Password Authenticated Key Exchange (PAKE) protocol such as per IETF RFC 6628. A prior interaction may further include use of a manufacturer-embedded asymmetric key such as an Intel® Enhanced Privacy ID (EPID) with a manufacturer-supplied certificate to establish a secure channel between credential management service and device (such as an Intel® Sigma and/or Intel® SigmaCE negotiated channel).

The tickets may likewise be integrity protected. The CMS may select between asymmetric or symmetric keys to protect the tickets based on the long term credentials available to the CMS. Device B forwards the ticket to Device A over the established TLS channel or possibly via an out of band channel if available. Note that the keyless tickets can be exchanged between Device A and Device B over an unsecured channel, in addition to the secured channel, resulting from the as yet un-promoted session keys. This exchange is possible because the KDC protects the tickets using long term keys that it maintains between each of the devices. Device B uses the certificate status to complete certificate verification of the initial session establishment and applies the authorization constraints optionally contained in the keyless ticket. The session key found in a session cache is extracted and promoted to a ticket key and placed in a key database, where ticket expiration is enforced. Device A performs similar key promotion in response to receipt of the keyless ticket.

Thus as shown in FIG. 1, a first connection attempt 101 may occur in a network 100. In an embodiment, network 100 may be a network of connected devices, including multiple IoT devices 120 and 130, which may communicate within an IoT network. Note that IoT devices 120 and 130 may in some cases be constrained devices. In any case, such IoT devices may include at least minimal computing capabilities. As such, IoT 120 and 130 devices may include one or more processors such as an SoC or other processing logic, one or more non-transitory memories and/or storage, as well as potentially other components such as actuators, sensors, network interfaces, and so forth. In at least some embodiments, a given processor or SoC (or portion thereof) may include separate secure circuitry (or may be configured to operate in a secure mode). Such secure mode provides a trusted execution environment (TEE) for the device. In example embodiments, a TEE of the device may leverage Intel® Software Guard Extensions (SGX), Intel® Mem-Core, Intel® Converged Security Engine (CSE), Intel® virtualization technology (VT-X), Intel® IOT-OS with Smack, ARM TrustZone, among other secure environments.

Still referring to FIG. 1, communication may occur with a credential manager 110 via another network 105, e.g., via the Internet. In an embodiment, credential manager 110 may be one or more computing devices, such as one or more server systems of a KDC, which may also act as CA. As illustrated, assume that device 120 loses connectivity to credential manager 110 but still wishes to communicate securely with device 130. To this end, the devices may establish a session with a certificate. As seen, device 120 may communicate a public key 126 in connection with this session establishment. In an embodiment, key 126 may be an asymmetric key. In turn responsive to this request, device 130 communicates a request for certificate status with regard to device 120 and further requests generation of a keyless ticket from credential manager 110. Thus as seen, device 130 receives a certificate status and multiple tickets from credential manager 110. More specifically, device 130 receives a first keyless ticket 140 (encrypted to device 120) and a second keyless ticket 145 (encrypted to device 130).

Assuming that the certificate status indicates that a certificate of device 120 is still valid and responsive to receipt of the keyless ticket, device 130 may promote an ephemeral key, such as a session key created during the establishment of the session between the devices, from a session key cache 132 (which may be a cache memory within device 130 or coupled thereto) to a symmetric key database 134. In different embodiments, symmetric key database 134 may be present within device 130 or coupled thereto. This promotion causes the session key to be promoted for use as a symmetric key, at least for a given time duration (as identified in the keyless ticket received from credential manager 110).

As further illustrated in FIG. 1, assuming that the certificate status is valid, device 130 may also provision keyless ticket 145 to device 120. In turn, responsive to receipt of this ticket, device 120 may promote an ephemeral key (e.g., a session key) from a session key cache 122 (which may be included in or coupled to device 120) to a symmetric key database 124 (including or coupled to device 120). As such, this promoted session key may be used as a symmetric key, for the specified time duration. Note that FIG. 1 describes a bilateral ticket provisioning scenario. Equally, a unilateral scenario may first occur and then directionality of the flow occurs. That is, the connection between IoT device 130 and credential manager 110 may be utilized to obtain two tickets corresponding to the device A-to-device B direction and the device B-to-device A direction.

Note that receipt of keyless ticket 145 in device 120 is the trigger to instruct device 120 to promote the ephemeral key stored in session key cache 122 to a long term key stored in symmetric key database 124. As such, keyless ticket 145 may be stored in database 124 associated with the promoted symmetric key. These items enable device 120 to later initiate a connection to device 130.

At the conclusion of the protocol shown in FIG. 1, symmetric key database 124 thus stores, in an entry associated with device 130: a key identifier, KeyID-Kab; a promoted key, Kab (promoted); and a key ticket, encrypted to second device 130, {KeyID-Kab}Kb. Similarly, symmetric key database 134 stores, in an entry associated with device 120: the key identifier, KeyID-Kab; the promoted key, Kab (promoted); and a keyless ticket, encrypted to first device 120, {KeyID-Kab}Ka. Note also that the keyless tickets may include additional permissioning, access control, realm context and instructions for enforcement of security upon decrypted ciphertext applied by the endpoints.

Note further that although not shown in FIG. 1, the devices may receive a receipt from credential manager 110 that is encrypted to each of the devices using long term keys Ka and Kb respectively, that allows a policy referring to the use of Kab using key identifier KeyID-Kab, where a security function, such as privacy preserving filter, may be applied prior to encryption of cleartext before communication. But given that the keyless tickets are already securely exchanged between credential manager 110 and device 130, such separate receipt protected similarly may be optional. Nevertheless, if credential manager 110 wishes to communicate instructions to device 120 that dictates actions the device should take upon cleartext prior to sending it to device 130, a receipt encrypted to device 120 may be incorporated into the keyless tickets provided by credential manager 110.

Thus, once a first keyless ticket is issued, a second keyless ticket based on utilization of the first ticket may be used to continue inter-device communications without the devices needing to use their asymmetric keys or perform certificate revocation list (CRL) checking. However, in some embodiments, credential manager 110 may perform CRL checking upon issuance of the second ticket to inform keyless ticket issuance.

Note that it may be assumed that when each device was on-boarded into the realm managed by credential manager 110 it attested the hardening level of the key storage and a trusted execution environment (TEE) of the device so that the credential manager may determine how many iterations of keyless tickets may be issued before requiring use of an asymmetric key and certificate. But note this authentication may be applied in the keyless ticket, rather than during session establishment. Thus an IoT device may not perform any public key infrastructure (PKI) revocation processing, and credential manager 110 may never know the symmetric keys held in symmetric key databases 124 and 134.

Figure 2:
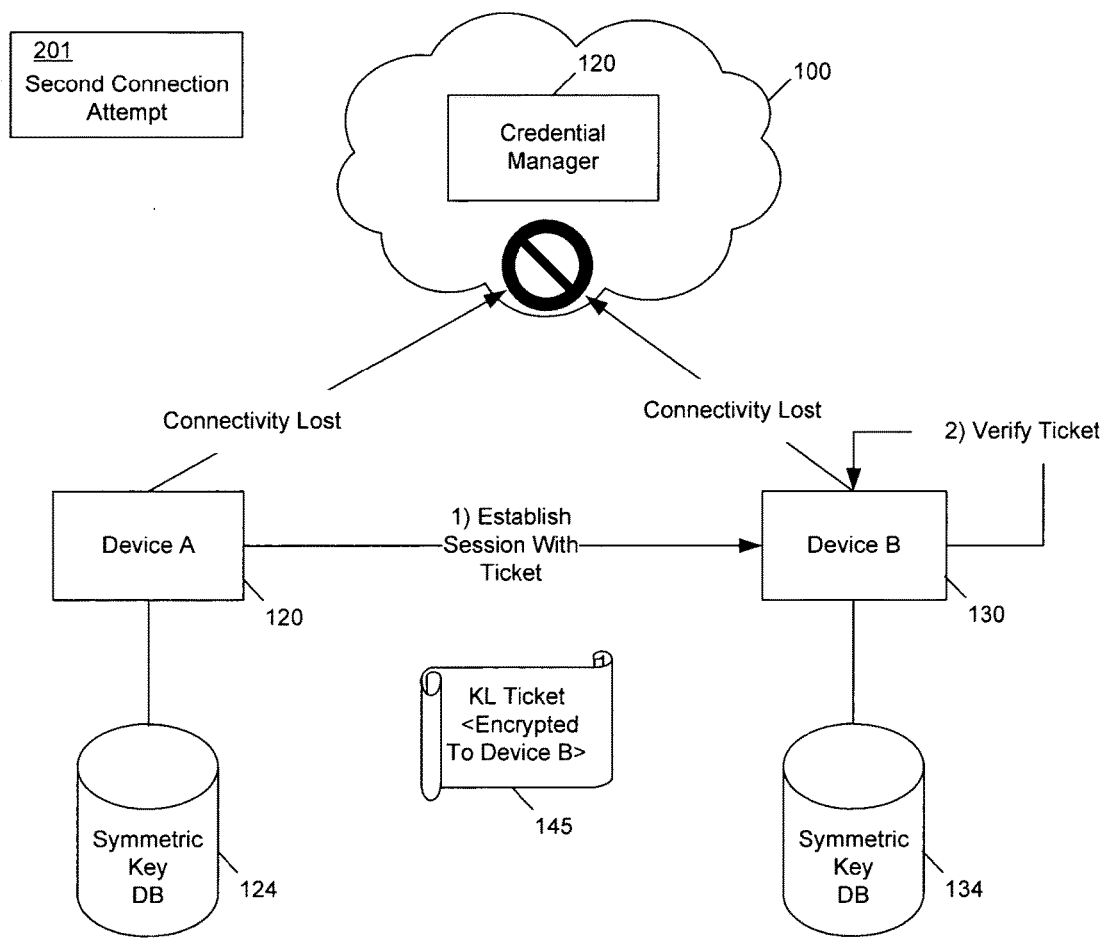
FIG. 2 is a scenario of a second connection attempt in accordance with an embodiment of the present invention.

Referring now to FIG. 2 shown is a scenario of a second connection attempt in accordance with an embodiment of the present invention, where connectivity to the Credential Manager is lost by both devices. The channel may close and a second session is established using an archived copy of the ephemeral key (obtained from the session cache). This session is authenticated using the ticket only until the ticket expires. Subsequent to ticket expiry, the above steps may be repeated. Furthermore, if a promoted key Kab is supplied as a pre-shared key (PSK) to a key exchange protocol such as a TLS ciphersuite, a new symmetric key is created. A second round of tickets may be issued in like manner as described in FIG. 1, resulting in a perpetual re-issuance of keyless tickets to keys that follow KDC-intermediated control without Devices A and B ever performing asymmetric crypto operations or using PKI verification operations. Note that a KDC may intercept PKI CRLs and/or perform OCSP requests at the time the keyless tickets are re-issued, so as to offload this from any IoT device. If connectivity permits, the certificate status may be proactively evaluated and traditional tickets issued. If the scenario plays out where Device A is the device with connectivity to the CM, Device A initiates the ticket request and delivers the ticket to Device B.

Thus as shown in FIG. 2, in a second connection attempt 201, it may be assumed that both devices have lost connectivity to credential manager 120. In the illustration shown, device 120 establishes a session with device 130 via previously-issued ticket 145. In turn, device 130 may verify that the ticket is valid (e.g., by determining whether the expiration of the ticket has not yet been reached). Assuming that the ticket is verified, the session may continue between the devices.

Figure 3:
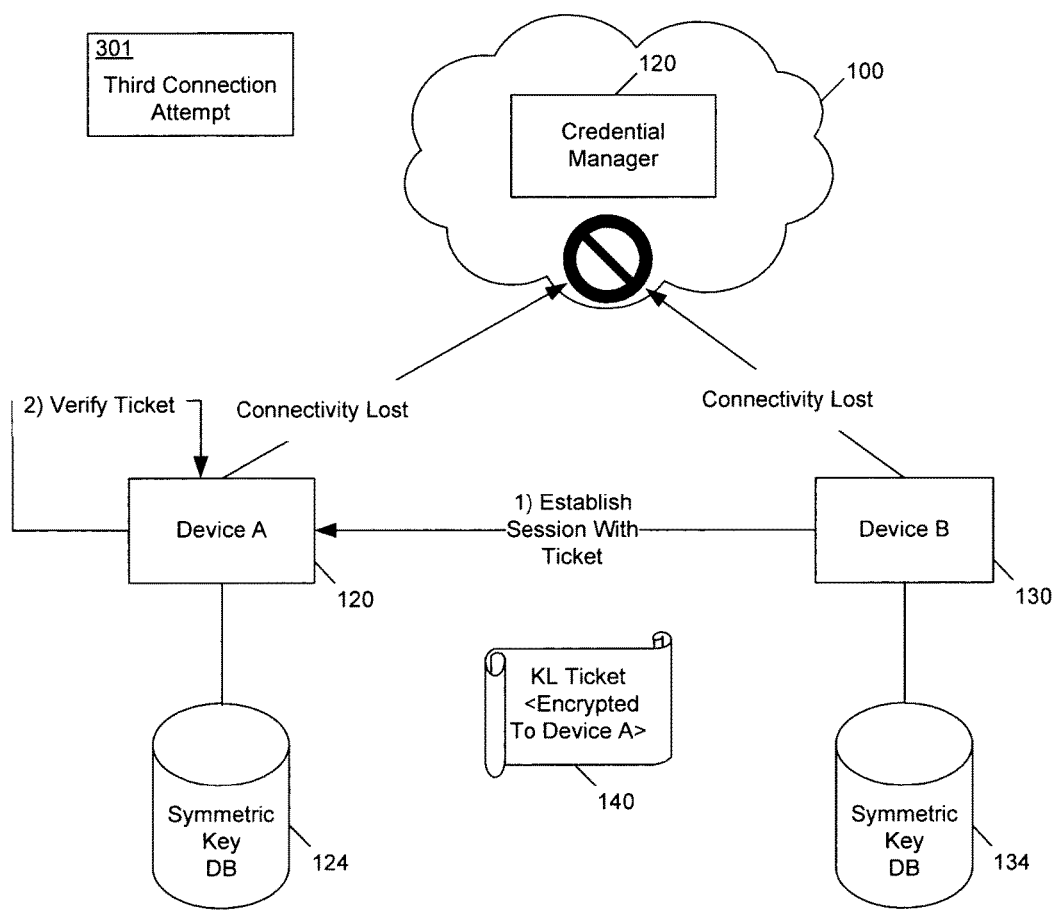
FIG. 3 is a scenario of a third connection attempt in accordance with an embodiment of the present invention.

Referring now to FIG. 3, shown is a scenario of a third connection attempt in accordance with an embodiment of the present invention where Device B initiates and Device A responds and where connectivity to a Credential Manager is lost. Optionally, a third connection attempt may involve Device B initiating a connection to Device A. Since Device B possesses a keyless ticket for Device A, it uses the ticket to establish a session. Device A verifies the ticket and that the symmetric key identified by the ticket is indeed the key used by Device B to establish the session. FIG. 3 shows a similar scenario for a third connection attempt 301 in which when both devices have lost connectivity to credential manager 120, and it is device 130 that establishes a session using ticket 140.

Embodiments enable IoT devices to proactively avoid unnecessary network accesses to the CM by obtaining keyless tickets authorizing use of a session key for subsequent connections that do not involve the CM. The devices may do this to avoid the undesirable behavior of periodic longer latency due to the need to access the credential manager for KDC/CA services. There is a security consideration surrounding the re-issuance of the ticket before a previous ticket expires, where the KDC relies on the endpoint devices to re-negotiate the ephemeral key. In order for this re-negotiation to not take place, both sides can collude to avoid rekey. This is an acceptable risk that is traded for the benefit of the KDC not being in possession of a copy of the symmetric key.

Embodiments thus differ from current practice where a session key cache may be maintained to accelerate session reconnection. Session key caches apply a caching policy that uniformly marks the cache contents stale, resulting in key expirations that do not align with CM policies. Also by promoting the session key to a ticket key, this key may be used for alternative forms of encryption including file/folder encryption, digital rights management/enterprise rights management (DRM/ERM) and different session level transports. This flexibility allows IoT devices to interact over the most appropriate and available transports, and not limited by the transport that hosts the session key cache.

This flexibility allows IoT devices to interact over the most appropriate and available transports—not limited by the transport that hosts the session key cache. A further embodiment of the invention includes using a second CM to supply certificate status information to a device that may rely on an asymmetric credential from a first CM and therefore obtains certificate status on the first CM. The device may use a trust anchor for a second CM where the root CA trust anchor does not expire. A further embodiment of the invention may use random number generator hardware such as Intel® digital random number generator (DRNG) hardware to provide strong random numbers such that a CM entropy source is unnecessary when generating symmetric keys. A further embodiment of the invention may use a TLS keyID parameter to communicate an identifier value from a first device to a second device identifying a cached symmetric key in a session cache that indicates an intention to the second device to obtain a keyless ticket. Note that this parameter need not originate from a TLS system. Nor does its use restrict the use of some other KeyID mechanism that a session key database uses to correlate contents of a session key cache. The keyID may be included in the keyless ticket(s) subsequently issued. A further embodiment of the invention uses a TLS event message to communicate an intention to re-key an existing keyless ticket whose expiration may be nearing and where the re-key may further involve re-exchanging Diffie-Hellman parameters and computation of a pre-shared key using a pseudo-random function (PRF) that includes a master secret from the Diffie-Hellman exchange and context values that also in the keyless ticket.

A further embodiment may use a long-term key by a constrained device to establish a secure session to a KDC or other less constrained device that has a reliable clock, where upon regular intervals, the constrained device obtains a time value from the less constrained device and where the time value may be used to evaluate credentials having expiration.

Embodiments thus use a credential manager to issue a keyless ticket that authorizes use of a symmetric key from an established session cache for independent subsequent session establishment. Embodiments may further use a keyless ticket to specify the constraints of interaction and access between IoT devices that have established a secure session using a certificate. A certificate status request message may be used by a CM to identify a second device authenticated by a first device where a keyless ticket is granted to the second device. Promotion of a session key to a ticket key may occur, where the ticket key lifetime and protection properties differ from that of the session key cache. In addition, a session key may be promoted to a ticket key using a PRF generating a different key value than the first.

Figure 4:
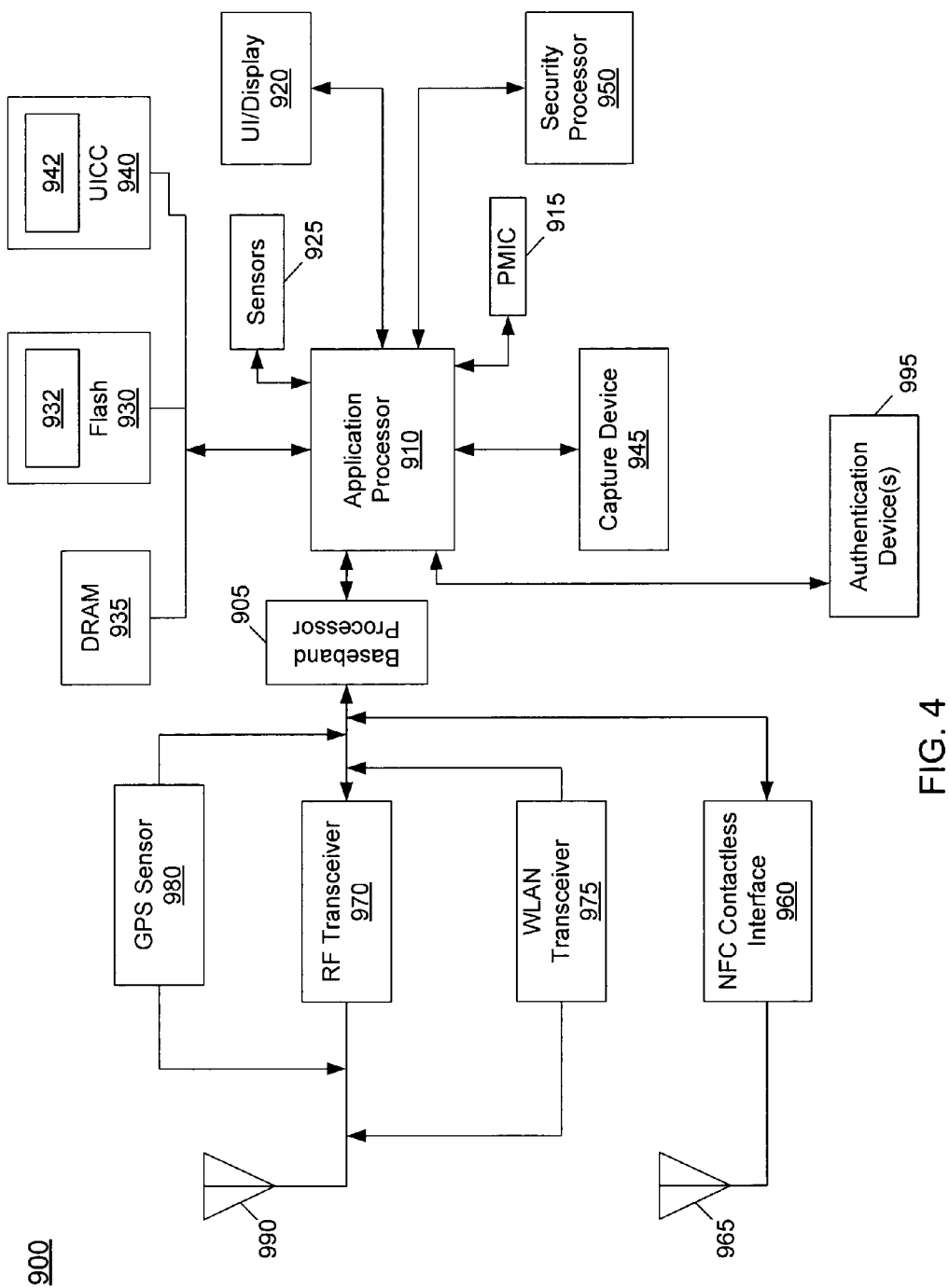
FIG. 4 is a block diagram of an example system with which embodiments can be used.

Referring now to FIG. 4, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may that may implement a TEE, and which may couple to application processor 910. Furthermore, application processor 910 may implement a secure mode of operation, such as Intel® SGX to a given instruction set architecture, and circuitry for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
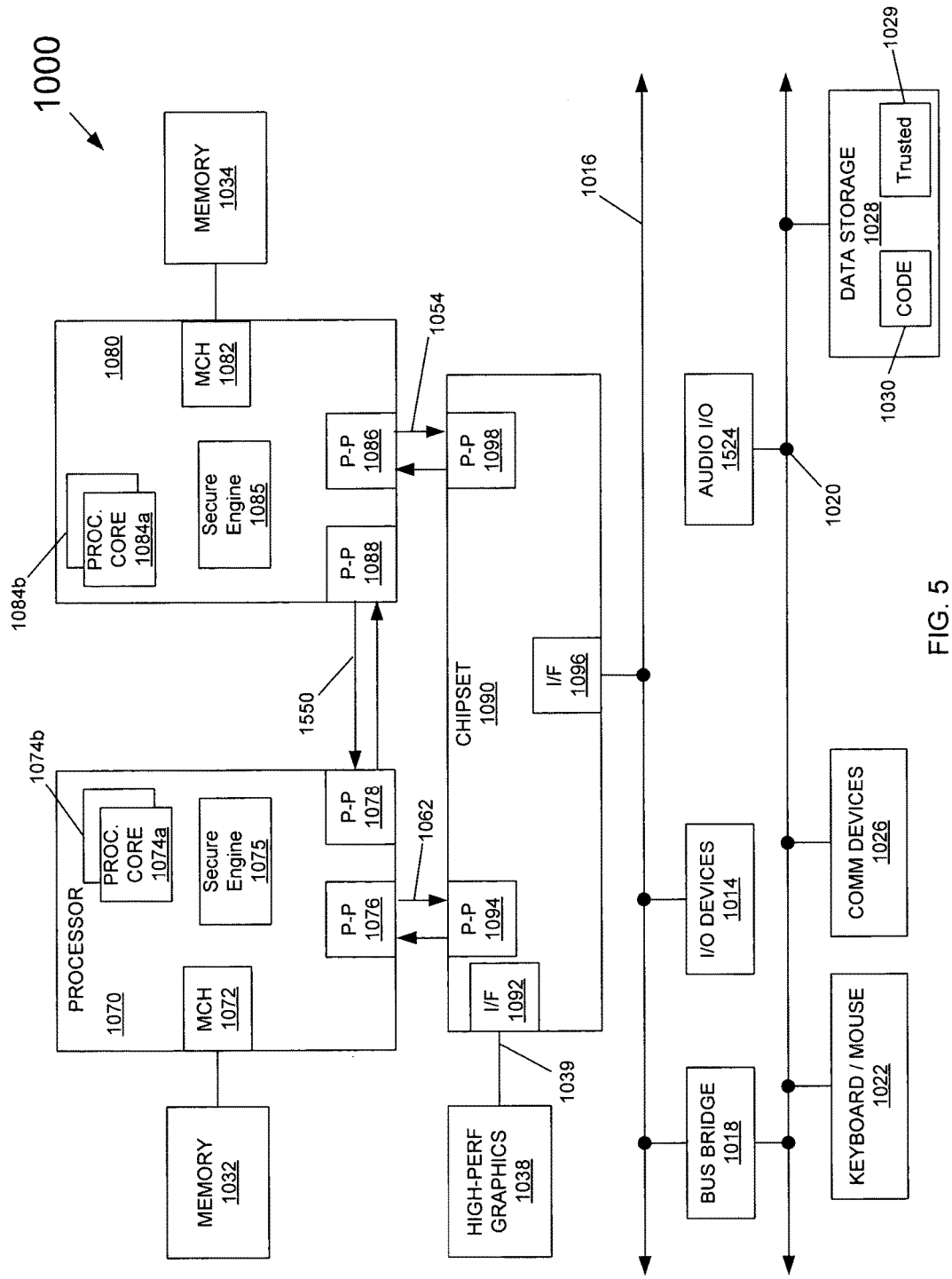
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as key management, attestations, IoT network onboarding or so forth.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 6:
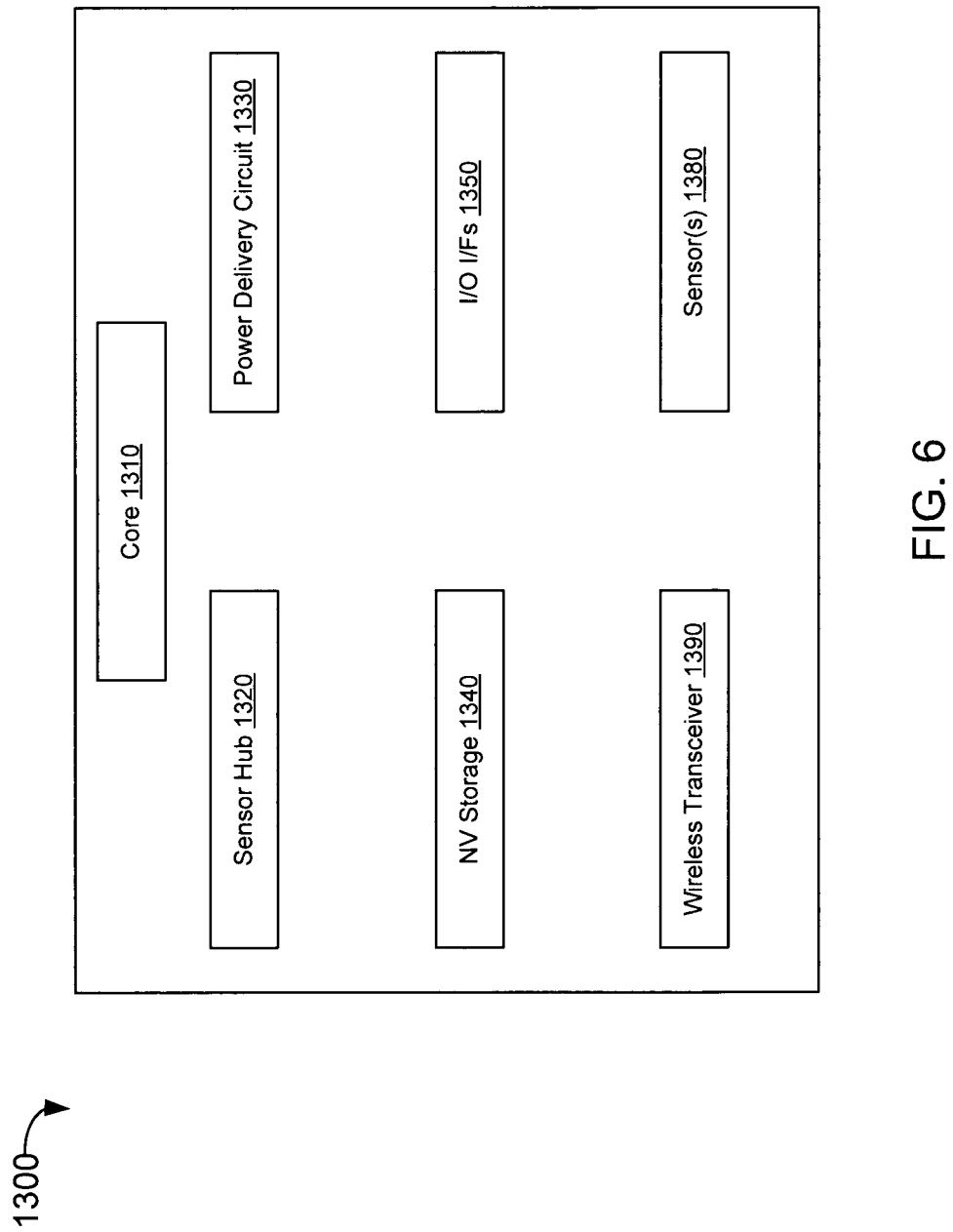
FIG. 6 is a block diagram of a wearable module in accordance with another embodiment.

Embodiments may be used in environments where IoT devices may include wearable devices or other small form factor IoT devices. Referring now to FIG. 6, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (JO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, a method comprises: establishing a first session between a first computing device and a second computing device, when the first computing device does not have connectivity to a credential manager; proxying a request to the credential manager from the second computing device on behalf of the first computing device and receiving in the second computing device a first keyless ticket encrypted to the first computing device and a second keyless ticket encrypted to the second computing device; providing the second keyless ticket from the second computing device to the first computing device; and enabling communication between the first and second computing devices according to the first and second keyless tickets.

In Example 2, the method further comprises communicating between the first and second computing devices using symmetric cryptography.

In Example 3, the first keyless ticket includes certificate status and context information regarding interaction between the first computing device and the second computing device.

In Example 4, the method further comprises accessing a first session key associated with the first session and promoting the first session key to a ticket key and storing the ticket key in a key database of the second computing device.

In Example 5, the method of one or more of the above Examples further comprises enabling the communication between the first computing device and the second computing device prior to an expiration of the ticket key.

In Example 6, the method of one or more of the above Examples further comprises establishing a second session between the first computing device and the second computing device based at least in part on the first keyless ticket, prior to expiration of the first keyless ticket.

In Example 7, the second keyless ticket is to be provided from the second computing device to the first computing device via an unsecured channel, the second keyless ticket protected by a long term key maintained by the credential manager.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 8, a device comprises: at least one hardware processor to execute instructions; at least one network interface to enable communication with one or more devices coupled in an IoT network with the device, the at least one network interface further to enable communication with a certificate authority to couple to the device via a second network; and a storage. The storage may store instructions that when executed by the device cause the device to: perform an exchange with a first device coupled to the device via the IoT network to generate an ephemeral key; receive an indication that the first device does not have network access to the certificate authority; access the certificate authority via the second network to obtain a first certificate-based authentication of the first device, the first certificate-based authentication for a first time period, where the first certificate-based authentication does not include a key; and interact with the first device for the first time period using the ephemeral key.

In Example 9, the first time period comprises an interval of intermittent connectivity to the second network.

In Example 10, the ephemeral key is not to be shared with the certificate authority.

In Example 11, the device further comprises a session key cache, where the device is to store the ephemeral key in the session key cache.

In Example 12, the device is to check with the certificate authority regarding a certificate status of the first device.

In Example 13, the device of one or more of the above Examples further comprises a key database. Responsive to validation of the certificate status of the first device by the certificate authority, the device is to promote the ephemeral key to a ticket key and store the ticket key in the key database, where the ticket key is to be valid for the first time period.

In Example 14, the device of one or more of the above Examples is to use the ticket key to perform a digital rights management operation.

In Example 15, the device of one or more of the above Examples is to obtain a time value from another device coupled to the device and determine whether the first time period has expired based on the time value.

In Example 16, the first certificate-based authentication is to authorize use of the ephemeral key for communication between the device and the first device without access to the certificate authority.

In Example 17, after expiration of the first time period, the device is to prevent a secure communication with the first device.

In Example 18, the certificate-based authentication comprises a first keyless ticket encrypted to the device and a second keyless ticket encrypted to the first device.

In Example 19, a system comprises: a first IoT device including at least one hardware processor and associated with a first session key cache and a first key database; and a second IoT device to couple to the first IoT device, the second IoT device including at least one hardware processor and associated with a second session key cache and a second key database. The second IoT device may be configured to establish a first session with the first IoT device when the first IoT device does not have connectivity to a credential manager, receive from the credential manager a first keyless ticket encrypted to the first device and a second keyless ticket encrypted to the second device, provide the second keyless ticket to the first IoT device, and communicate with the first IoT device according to one or more of the first and second keyless tickets for a first time period for which at least one of the first and second keyless tickets is valid.

In Example 20, the first IoT device is, responsive to receipt of the second keyless ticket, to access a first session key associated with the first session stored in the first session key cache and promote the first session key to a first ticket key and store the first ticket key in the first key database.

In Example 21, the first IoT device is to establish a second session between the first IoT device and the second IoT device using the second keyless ticket and the first ticket key, prior to expiration of the first time period.

In Example 22, the first IoT device and the second IoT device are to communicate using one or more of the first keyless ticket and the second keyless ticket, without use of an asymmetric key and without performance of a certificate revocation check.

In Example 23, the first keyless ticket comprises an indication of a number of keyless tickets to be issued before use of an asymmetric key and performance of a certificate revocation check is to occur.

In Example 24, a device comprises: at least one hardware processor means for executing instructions; at least one network interface means for enabling communication with one or more devices coupled in an IoT network with the device, the at least one network interface means further for enabling communication with a certificate authority to couple to the device via a second network; and a storage means. The storage means may store instructions that when executed by the device cause the device to: perform an exchange with a first device coupled to the device via the IoT network to generate an ephemeral key; receive an indication that the first device does not have network access to the certificate authority; access the certificate authority via the second network to obtain a first certificate-based authentication of the first device, the first certificate-based authentication for a first time period, where the first certificate-based authentication does not include a key; and interact with the first device for the first time period using the ephemeral key.

In Example 25, the device further comprises a session key cache means for storing the ephemeral key.

In Example 26, the device further comprises a key database means for storing a ticket key, wherein responsive to validation of the certificate status of the first device by the certificate authority, the device is to promote the ephemeral key to the ticket key to be valid for the first time period.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
    establish a first session between a first computing device and a second computing device, when the first computing device does not have connectivity to a credential manager;
    proxy a keyless ticket request to the credential manager from the second computing device on behalf of the first computing device and receive, in response to the keyless ticket request, in the second computing device from the credential manager a first keyless ticket encrypted to the first computing device and a second keyless ticket encrypted to the second computing device;
    provide the second keyless ticket from the second computing device to the first computing device; and enable communication between the first and second computing devices according to the first and second keyless tickets.

2. The at least one non-transitory computer readable storage medium of claim 1, further comprising instructions that enable the system to communicate between the first and second computing devices using symmetric cryptography.

3. The at least one non-transitory computer readable storage medium of claim 1, wherein the first keyless ticket includes certificate status and context information regarding interaction between the first computing device and the second computing device.

4. The at least one non-transitory computer readable storage medium of claim 1, further comprising instructions that when executed enable the system to access a first session key associated with the first session and promote the first session key to a ticket key and store the ticket key in a key database of the second computing device.

5. The at least one non-transitory computer readable storage medium of claim 4, further comprising instructions that when executed enable the system to enable the communication between the first computing device and the second computing device prior to an expiration of the ticket key.

6. The at least one non-transitory computer readable storage medium of claim 1, further comprising instructions that when executed enable the system to establish a second session between the first computing device and the second computing device based at least in part on the first keyless ticket, prior to expiration of the first keyless ticket.

7. The at least one non-transitory computer readable storage medium of claim 1, wherein the second keyless ticket is to be provided from the second computing device to the first computing device via an unsecured channel, the second keyless ticket protected by a long term key maintained by the credential manager.

8. A device comprising:
at least one hardware processor to execute instructions;
at least one network interface to enable communication with one or more devices coupled in an Internet of Things (IoT) network with the device, the at least one network interface further to enable communication with a certificate authority to couple to the device via a second network;
a storage to store instructions that when executed by the device cause the device to:
perform an exchange with a first device coupled to the device via the IoT network to generate an ephemeral key;
receive an indication that the first device does not have network access to the certificate authority;
in response to the indication, access the certificate authority via the second network to obtain a first certificate-based authentication of the first device, the first certificate-based authentication having a validity period for a first time period, wherein the first certificate-based authentication does not include a key; and
promote the ephemeral key to a ticket key to enable interaction with the first device for the first time period using the promoted ephemeral key.

9. The device of claim 8, wherein the first time period comprises an interval of intermittent connectivity to the second network.

10. The device of claim 8, wherein the ephemeral key is not to be shared with the certificate authority.

11. The device of claim 8, further comprising a session key cache, wherein the device is to store the ephemeral key in the session key cache.

12. The device of claim 11, wherein the device is to check with the certificate authority regarding a certificate status of the first device.

13. The device of claim 12, further comprising a key database, wherein responsive to validation of the certificate status of the first device by the certificate authority, the device is to promote the ephemeral key to the ticket key and store the ticket key in the key database, wherein the ticket key is to be valid for the first time period.

14. The device of claim 13, wherein the device is to use the ticket key to perform a digital rights management operation.

15. The device of claim 13, wherein the device is to obtain a time value from another device coupled to the device and determine whether the first time period has expired based on the time value.

16. The device of claim 8, wherein the first certificate-based authentication is to authorize use of the ephemeral key for communication between the device and the first device without access to the certificate authority.

17. The device of claim 16, wherein after expiration of the first time period, the device is to prevent a secure communication with the first device.

18. The device of claim 8, wherein the certificate-based authentication comprises a first keyless ticket encrypted to the device and a second keyless ticket encrypted to the first device.

19. A system comprising:
a first Internet of Things (IoT) device including at least one hardware processor and associated with a first session key cache and a first key database; and
a second IoT device to couple to the first IoT device, the second IoT device including at least one hardware processor and associated with a second session key cache and a second key database, wherein the second IoT device is to establish a first session with the first IoT device using a certificate when the first IoT device does not have connectivity to a credential manager, proxy a keyless ticket request to the credential manager, in response to the keyless ticket request receive from the credential manager a first keyless ticket encrypted to the first device and a second keyless ticket encrypted to the second device, provide the second keyless ticket to the first IoT device, and communicate with the first IoT device according to one or more of the first and second keyless tickets for a first time period for which at least one of the first and second keyless tickets is valid.

20. The system of claim 19, wherein the first IoT device is, responsive to receipt of the second keyless ticket, to access a first session key associated with the first session stored in the first session key cache and promote the first session key to a first ticket key and store the first ticket key in the first key database.

21. The system of claim 20, wherein the first IoT device is to establish a second session between the first IoT device and the second IoT device using the second keyless ticket and the first ticket key, prior to expiration of the first time period.

22. The system of claim 21, wherein the first IoT device and the second IoT device are to communicate using one or more of the first keyless ticket and the second keyless ticket, without use of an asymmetric key and without performance of a certificate revocation check.

23. The system of claim 19, wherein the first keyless ticket comprises an indication of a number of keyless tickets to be issued before use of an asymmetric key and performance of a certificate revocation check is to occur.

* * * * *